United States Patent
Foley et al.

(10) Patent No.: US 11,868,612 B1
(45) Date of Patent: Jan. 9, 2024

(54) MANAGING STORAGE OPERATIONS IN STORAGE SYSTEMS

(71) Applicant: EMC Corporation, Hopkinton, MA (US)

(72) Inventors: Robert P. Foley, Clinton, MA (US); Peter Puhov, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/084,529

(22) Filed: Mar. 30, 2016

(51) Int. Cl.
*G06F 3/06* (2006.01)

(52) U.S. Cl.
CPC .......... *G06F 3/0604* (2013.01); *G06F 3/0631* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 8,972,694 | B1* | 3/2015 | Dolan | G06F 13/28 711/170 |
| 2006/0242489 | A1* | 10/2006 | Brockway | G06F 17/30309 714/718 |
| 2008/0288738 | A1* | 11/2008 | Gokhale | G06F 3/0613 711/171 |
| 2010/0094999 | A1* | 4/2010 | Rama | G06F 9/4843 709/225 |
| 2016/0012856 | A1* | 1/2016 | Cave, Jr. | G11B 27/005 386/241 |
| 2016/0224244 | A1* | 8/2016 | Gensler, Jr. | G06F 3/0604 |

\* cited by examiner

*Primary Examiner* — Baboucarr Faal
(74) *Attorney, Agent, or Firm* — Krishnendu Gupta; Deepika Bhayana; Derek Lam (57) ABSTRACT

A method is used in managing storage operations in storage systems. Based on a set of criteria, an amount of storage resources required to perform a storage operation is determined. The storage operation is directed to fault tolerant storage devices. The amount of storage resources is allocated prior to start performing the storage operation. The storage operation is performed by using the allocated storage resources.

20 Claims, 5 Drawing Sheets

MANAGING STORAGE OPERATIONS IN STORAGE SYSTEMS.

SEND A REQUEST TO DETERMINE THE AMOUNT OF STORAGE RESOURCES REQUIRED TO PERFORM A STORAGE OPERATION DIRECTED TO FAULT TOLERANT STORAGE DEVICES.
400

BASED ON INFORMATION RECEIVED REGARDING THE STORAGE OPERATION AND A SET OF CRITERIA, DETERMINE THE AMOUNT OF STORAGE RESOURCES REQUIRED TO SUCCESSFULLY PERFORM THE STORAGE OPERATION.
402

BASED ON THE DETERMINATION, ALLOCATE THE STORAGE RESOURCES.
404

PROVIDE THE ALLOCATED STORAGE RESOURCES FOR PERFORMING THE STORAGE OPERATION.
406

MANAGING STORAGE OPERATIONS IN STORAGE SYSTEMS

BACKGROUND

Technical Field

This application relates to managing storage operations in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level.

There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, Triple Parity—Triply redundant RAID that extends RAID-6 to provide support for up to three failures compared to the support for two failures for RAID-6, and the like) may provide varying degrees of fault tolerance. Further, RAID parity schemes may be utilized to provide error detection during the transfer and retrieval of data across a storage system.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. For example, RAID-5 techniques can be used in connection with a data storage system to protect from a single device failure.

In a particular RAID-5 context, for example, which comprises a storage array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed. The system is then said to be operating in a "degraded" mode since extra processing operations and, accordingly, extra time is required to reconstruct the data in the failed disk sector when access thereto is required.

As users access content on these RAID arrays, IO requests will be processed. Unfortunately, when a large quantity of IO requests are received by RAID arrays during a short period of time, such RAID arrays may become bogged down and performance may be adversely impacted.

SUMMARY OF THE INVENTION

A method is used in managing storage operations in storage systems. Based on a set of criteria, an amount of storage resources required to perform a storage operation is determined. The storage operation is directed to fault tolerant storage devices. The amount of storage resources is allocated prior to start performing the storage operation. The storage operation is performed by using the allocated storage resources.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in managing storage operations in storage systems, which technique may be used to provide, among other things, based on a set of criteria, determining an amount of storage resources required to perform a storage operation, where the storage operation is directed to fault tolerant storage devices, allocating the amount of storage resources prior to start performing the storage operation, and performing the storage operation by using the allocated storage resources.

As described herein, RAID (Redundant Array of Independent Disks) provides a way of storing the same data in different places thereby creating redundancy on multiple storage disks. By placing data on multiple storage disks, input/output (I/O) operations can overlap in a balanced way thereby improving performance. Further, storing data redundantly on multiple storage disks also increases fault tolerance. Generally, RAID is a data storage virtualization technology that combines multiple physical disk drive components into a single logical unit for the purposes of data redundancy, performance improvement, or both.

Generally, a storage operation such as an IO operation (e.g., read, write) performed on RAID storage devices (also referred to herein as "RAID operation" or "RAID storage operation") require a certain quantity of memory resources in order to successfully complete the storage operation. For example, RAID write operations require storage resources such as memory for calculating parity for RAID storage devices to which such write operations are directed to.

Conventionally, upon receiving a request for performing a RAID operation, a storage system allocates storage resources required for performing the RAID operation after receiving the request as and when needed during the time the storage system performs the RAID operation. Thus, in such a conventional system, when a client sends a request to RAID logic in a storage system for performing a RAID storage operation, the RAID logic may not have every storage resource available to complete the RAID storage operation. Further, in such a conventional system, RAID logic and a client that sends a request for a RAID storage operation to RAID logic allocate storage resources for the RAID storage operation as and when such storage resources are required during the time the RAID storage operation is performed. Thus, in such a conventional system, when a RAID storage operation is being executed, additional storage resources required during execution of the RAID storage operation may not be available at a later time thereby impacting performance of the RAID storage operation where the RAID storage operation has to wait till the time storage resources become available. Further, in such a conventional system, when a client sends a request to perform a RAID storage operation, a specific amount of storage resources are allocated for the RAID storage operation at the time such storage operation is started. In such a conventional case, if additional storage resources are required during execution of the RAID storage operation and such additional storage resources are not available in a storage system, the RAID storage operation waits until such additional storage resources become available thereby impacting performance and availability of storage resources in a storage system. Thus, in such a conventional system, when a request to perform a storage operation is received by RAID logic of a storage system, the RAID logic computes the amount of storage resources that are required to perform the storage operation, the RAID logic allocates such storage resources and starts performing the RAID operation without taking into consideration any additional storage resources that may be required during execution of the storage operation.

By contrast, in at least some implementations in accordance with the technique as described herein, entire storage resources required to complete a RAID storage operation are determined and allocated prior to starting the RAID storage operation such that the RAID operation is started only after allocating storage resources that may be required to completely perform the RAID storage operation. Thus, in at least one embodiment of the current technique, all of the storage resources required for performing a RAID operation are allocated prior to starting the RAID operation. In at least one embodiment of the current technique, a client of RAID logic in a storage system requests the RAID logic to provide information regarding the amount of storage resources required for a RAID storage operation prior to sending a request to the RAID logic for performing the RAID storage operation. In at least one embodiment of the current technique, the RAID logic determines the amount of storage resources (e.g., memory buffers, control buffers) required for the RAID storage operation based on information provided by the client regarding the RAID storage operation. In such a case, based on the information regarding the amount of storage resources required for the RAID storage operation provided by the RAID logic, the client allocates the amount of storage resources and provide such storage resources to the RAID logic. Further, the RAID logic start performing the RAID storage operation upon receiving the storage resources required for the RAID storage operation.

In at least some implementations in accordance with the current technique as described herein, the use of the managing storage operations in storage systems technique can provide one or more of the following advantages: improving efficiency of a data storage system by efficiently allocating storage resources in the data storage system, improving performance and memory consumption in a storage system by starting to perform only those RAID storage operations that can complete successfully without having to wait for additional storage resources, improving the number of RAID storage operations that can be started in a storage system with available storage resources, improving memory and performance efficiency of a RAID storage operation by ensuring that the RAID storage operation is completed in less amount of time as the RAID operation no longer has to wait to allocate additional storage resources, and simplifying complexity of RAID logic component of a storage system as the RAID logic component no longer has to allocate additional storage resources and manage pending storage operations.

Figure 1:
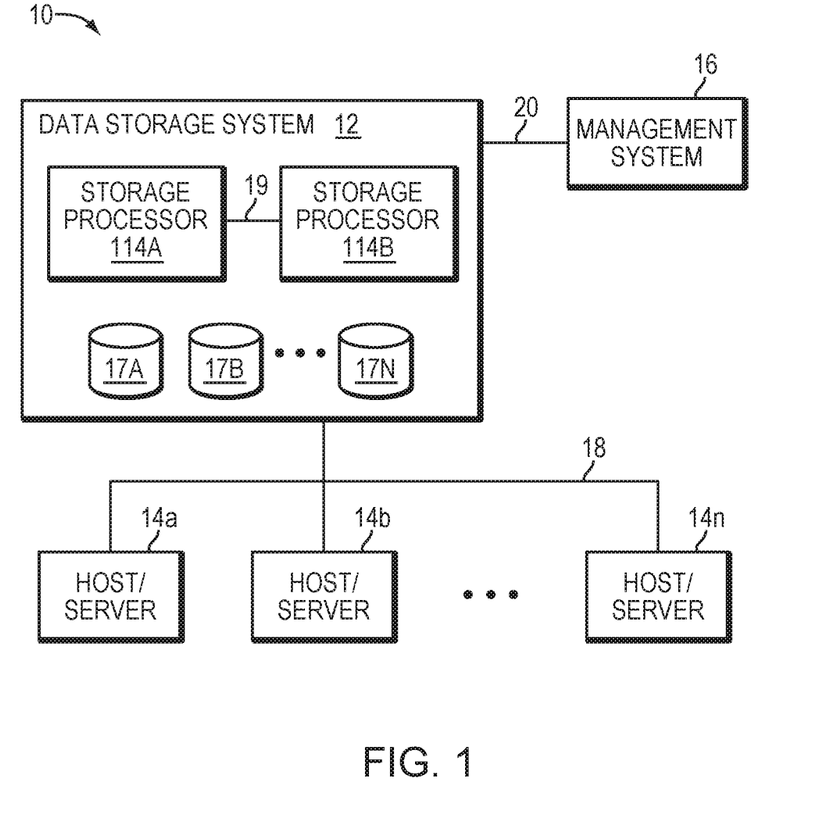
FIGS. 1-2 are examples of an embodiment of a computer system that may utilize the techniques described herein.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 18. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 48 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 18 by any one of variety of connections in accordance with the type of communication medium 18. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication medium 18, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage system 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, MA. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally used in connection with any one or more data storage system each including a different number of storage processors than as illustrated herein. The data storage system 12 may be a data storage array, such as a VNX™ or VNXe™ data storage array by EMC Corporation of Hopkinton, Massachusetts, including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX™ or VNXe™ data storage system mentioned above may include two storage processors 114A, 114B for performing processing in connection with servicing requests.

Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

Storage operations performed in a data storage system 12 may include I/O operations which are received by the data storage system 12 from an external client, such as a host. Depending on the data storage configuration, the single host I/O operation, such as for a write operation, may result in more than one write operation to one or more physical drives on the data storage system. For example, if the host write is directed to a logical device, such as a LUN, having storage provisioned from a RAID group having a RAID-1 mirroring configuration with two physical drives, then a single front end or host I/O to the LUN results in two back-end physical device writes to each of the two mirrored physical devices of the storage system comprising the RAID group.

Figure 2:
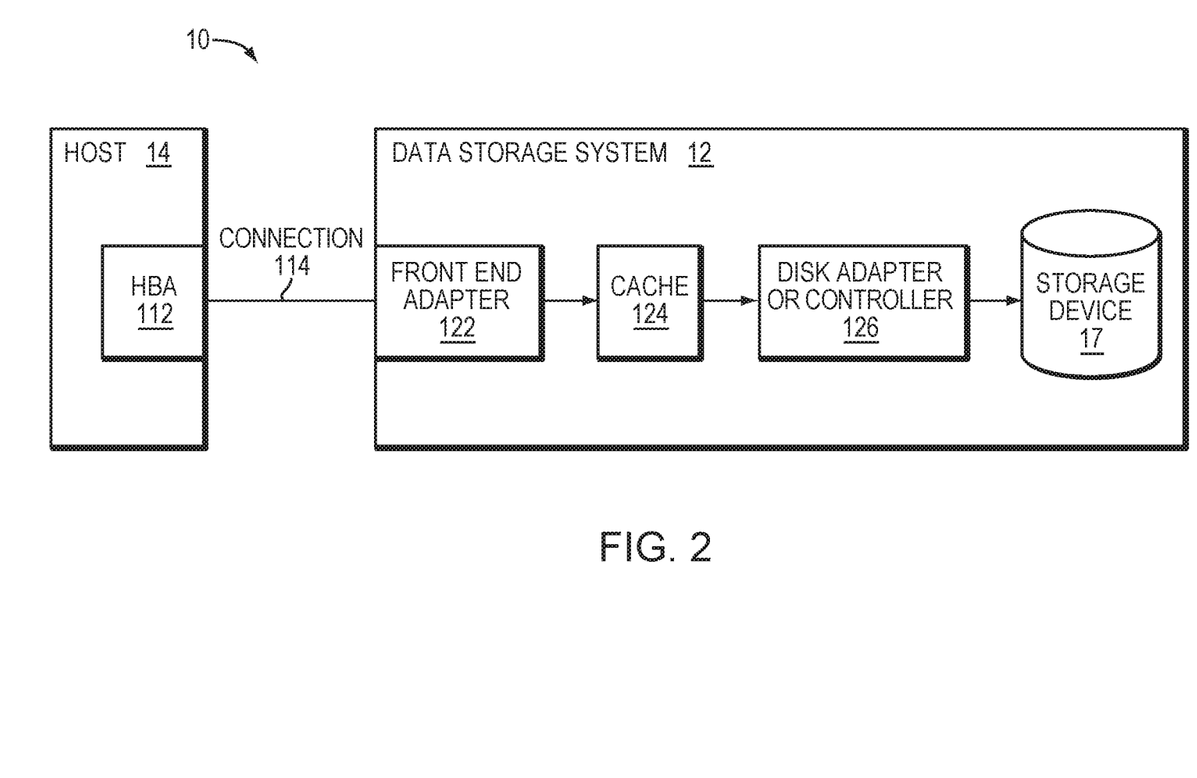

With reference to FIG. 2, shown is an example 10 illustrating components of a system that may be used in an embodiment in accordance with techniques herein. The example 10 includes a simplified view of components of a system as described above. The example 10 includes a host 14 with an Host Bus Adapter ("HBA") 112. The host 14 communicates with data storage system 12 over connection 114. Connection 114 may be, for example, a network connection between the HBA 112 and a front end adapter 122 of the data storage system 12. As described above, a front end adapter 122 may be, for example, a Fibre Channel Adapter ("FA") or other adapter which facilitates host communication. The data storage system 12 also includes a cache 124, a Disk Adapter ("DA") or storage controller 126 and one or more physical storage devices 17 (e.g., rotating disks or solid state devices (SSDs) such as a flash drive).

Components of the data storage system 12, such as a Host Adapter ("HA"), which may communicate with a host may also be referred to as front end components. Within the data storage system 12, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the HAs, and the cache memory 124. An embodiment, for example, may use one or more internal busses and/or communication modules. For example, the cache memory 124 may be used to facilitate data transfers and other communications between the DAs and HAs in a data storage system.

Data storage system 12 may include a plurality of storage devices such as disk devices or volumes included in an arrangement consisting of n rows of disks or more generally, data storage devices, 17a-17n. In this arrangement, each row of disks may be connected to a disk adapter ("DA") or director responsible for the backend management of operations to and from a portion of the disks 17. In a data storage system such as by EMC Corporation, a backend DA may also be referred to as a disk controller. The DA may perform operations such as reading data from, and writing data to, the physical devices which are serviced by the DA.

The host 14 may issue an I/O operation to the data storage system over connection 114. For example, the host may issue a write operation to write data to a portion of storage device 17. In one embodiment, the data of the write operation may first be stored in cache 124 and then de-staged at a later point in time by DA 126 to the physical storage device 17. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 14. Thus, a read resulting in a cache hit may be serviced without having to access the physical storage device 17 for the data. If the requested data is not in cache 124, the data is retrieved by the DA 126 from the storage device 128, stored in cache 124, and then returned by the front end adapter 122 to the host 14.

Examples of cache 124 may include but are not limited to a volatile, solid-state, cache memory system (e.g., a dynamic RAM cache memory system) and/or a non-volatile, solid-state, cache memory system (e.g., a flash-based, cache memory system).

As described in more detail in following paragraphs and figures and with reference to FIG. 1, each of the SPs 114A, 114B may have its own instance of a data model, such as an object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like.

Figure 3:
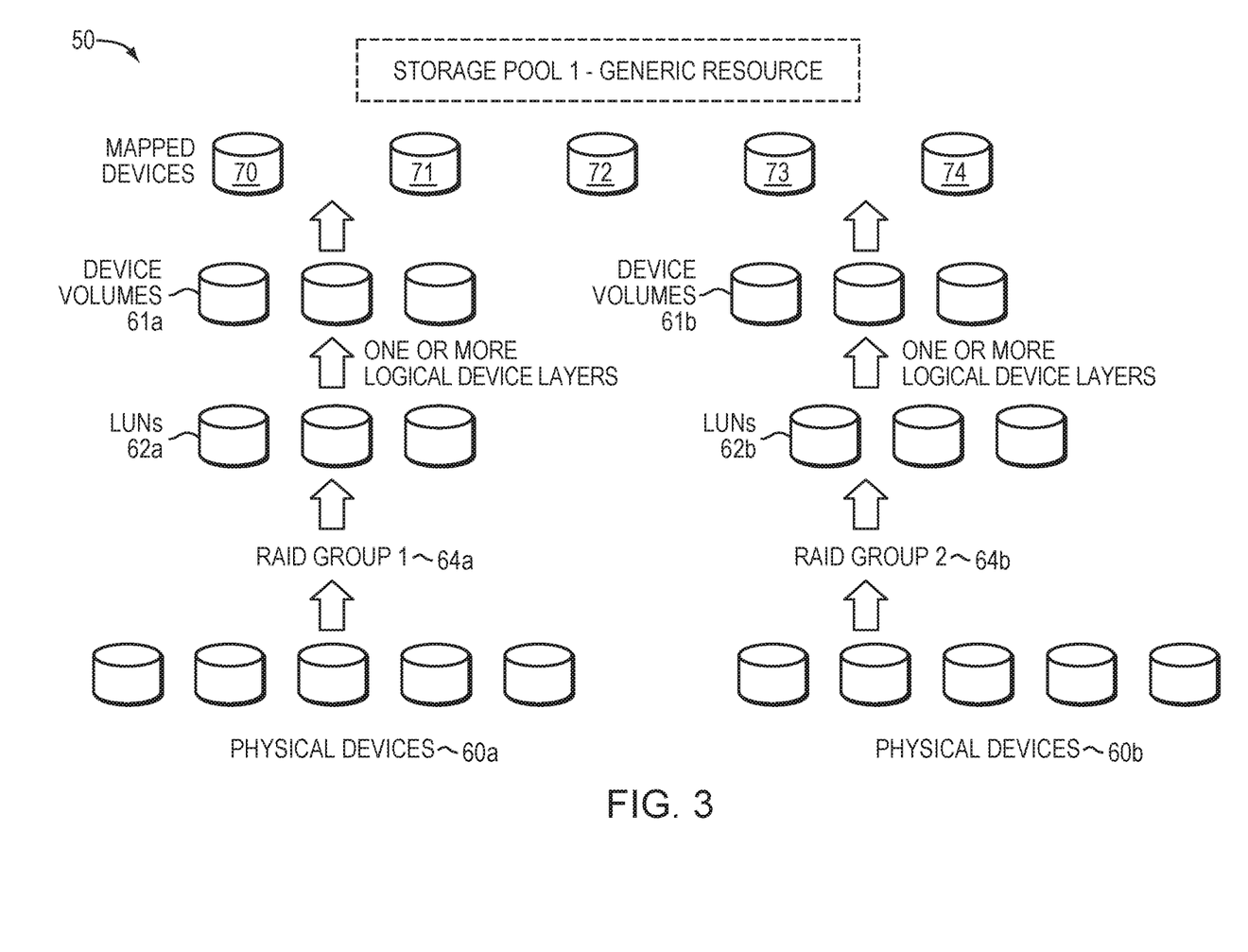
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. A disk may be a physical disk within the storage system. A LUN may be a logical unit number which is an identifier for a Logical Unit. Each slice of data may have a mapping to the location of the physical drive where it starts and ends.

Figure 4:
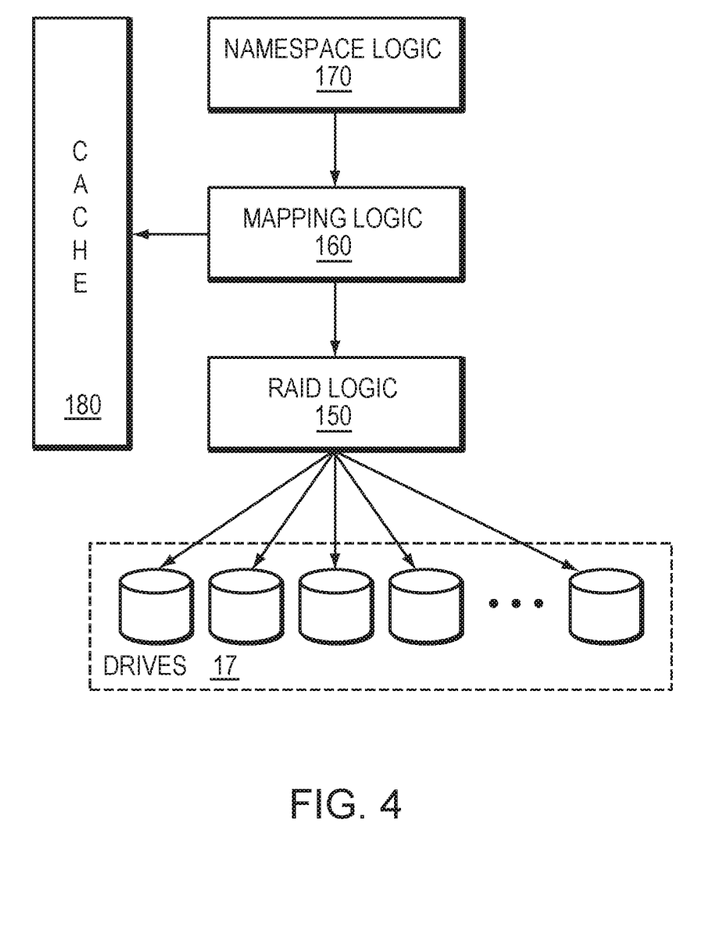
FIG. 4 is a diagram illustrating in more detail components that may be used in connection with techniques herein.

Referring to FIG. 4, shown is more detailed representation of components that may be included in an embodiment using the techniques herein. With reference also to FIGS. 1-3, namespace logic component 170 exports LUNs to a host and mapping logic component 160 presents storage extents to namespace logic component 170 for provisioning storage space from the storage extents to a LUN presented to a host by namespace logic component 170. Further, RAID logic component 150 consumes storage from storage devices 17 and provides such storage to mapping logic component 160 which further provides such storage as a storage extent to the namespace logic component 170. In at least one embodiment of the current technique, mapping logic component 160 sends a request to perform a RAID storage operation to RAID logic component 150 in accordance with techniques described herein.

In at least some systems, for example, host 14 sends an I/O request through HBA 112 to data storage system 12. Based on the I/O request, data storage system 12 sends corresponding data requests to disk drives 17 through DA 126 and RAID logic component 150 where RAID logic component 150 is leveraged to provide management and access to storage of disk drives 17. In at least one embodiment of the current technique, RAID logic component 150 receives a request from a client such as mapping logic component 160 to determine the amount of storage resources required to perform a storage operation. For example, such request may be a query to get information regarding memory and the request may include information regarding the storage volume such as logical block address and block count. Based on the information received regarding the storage operation, RAID logic component 150 determines the amount of storage resources such as memory buffers required for the storage operation. In such a case, the storage resources may include control structures, buffers for reading data, parity and/or calculation of a new parity. Further, RAID logic component 150 attempts to over-estimate the amount of storage resources that may be required to perform a storage operation and calculates the amount of storage resources required for the storage operation based on a set of criteria which may include the type of RAID (e.g., RAID-5, RAID-6, Triple Parity—Triply redundant RAID that extends RAID-6 to provide support for up to three failures compared to the support for two failures for RAID-6), geometry of RAID (e.g., element size), the type of storage operation (e.g., read, write), and the type of algorithm being used to perform this storage operation on backend storage disks. In addition, the state of a volume and media associated with a storage operation may be taken into consideration for computing the amount of storage resources required for performing the storage operation. For example, a storage operation may require significantly more storage resources if RAID storage is in degraded mode. Further, if a media error has previously been encountered on a particular storage disk area, a different amount of storage resources may be required to perform a storage operation such as resources for reconstructing data of the particular storage disk area.

Further, in at least one embodiment of the current technique, RAID logic 150 provides information regarding the amount of storage resources such as memory required for a storage operation to a client such as mapping logic 160. Further, the information provided by RAID logic 150 may include the number of bytes of control memory required for the storage operation and the number of bytes of data or parity memory required for the storage operation as control memory and data memory may be allocated from separate pools. Generally, a storage operation such as an I/O request to RAID logic 150 includes information such as logical block address, block count, block size, the type of operation (e.g., read, write), volume ID, and the scatter-gather list for data. The current technique adds additional data to such information included in the I/O operation which includes a scatter-gather list and scatter-gather count for control memory and a scatter-gather list and scatter-gather count for data and/or parity memory. Further, mapping logic 160 allocates storage resources required for performing a storage operation based on information provided by RAID logic 150 and provides such resources to RAID logic 150 along with a request to perform the storage operation. Upon receiving a request to perform a storage operation, RAID logic 150 confirms that the amount and type of storage resources received from mapping logic 160 is accurate for the type of storage operation received from mapping logic 160. Upon determining that the storage resources received for performing a storage operation is not in accordance with the type of storage operation and the amount of the storage resources required for completing the storage operation, RAID logic 150 may reject the storage operation by returning an error message.

Figure 5:
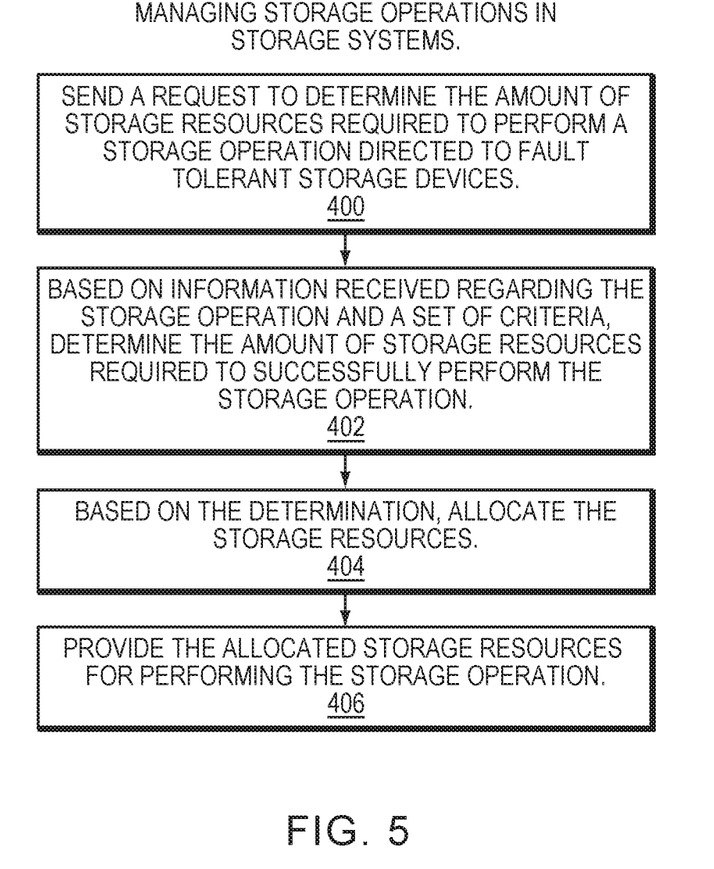
FIG. 5 is a flow diagram illustrating processes that may be used in connection with techniques herein.

Referring to FIG. 5, shown is a more detailed flow diagram illustrating managing recovery from data inconsistencies in storage systems. With reference also to FIGS. 1-4, a request is sent to RAID logic 150 for determining the amount of storage resources required to perform a storage operation directed to fault tolerant storage devices such as RAID (step 400). Based on information received regarding the storage operation and a set of criteria, RAID logic 150 determines the amount of storage resources required to successfully perform the storage operation (step 402). Based on the determination, storage resources are allocated (step 404). The allocated storage resources are provided to RAID logic 150 for performing the storage operation (step 406).

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing storage operations in storage systems, the method comprising:
   based on a set of criteria, determining a total amount of storage resources of a storage system required to completely perform a storage operation, wherein the storage operation is directed to fault tolerant storage devices of the storage system, wherein the total amount of storage resources is determined prior to sending a request to perform the storage operation;
   based on the determination of the total amount and based on the type of storage resources required to completely perform the storage operation, allocating the total amount of storage resources prior to starting to perform the storage operation; and
   avoiding waiting for any additional storage resources required during execution of the storage operation to complete the storage operation to become available during performance of the storage operation by performing the storage operation using the allocated storage resources that are determined and allocated prior to starting the storage operation, wherein determining the total amount of storage resources comprises determining, prior to sending the request to perform the storage operation, amounts of memory buffers, control buffers, control structures, buffers for reading data, buffers for reading parity, buffers for calculation of a new parity, or any combination thereof, that would be incurred in the course of executing the storage operation to complete the storage operation.

2. The method of claim 1, wherein the storage operation includes a Redundant Array of Inexpensive Disks (RAID) operation performed on a RAID system.

3. The method of claim 1, wherein the fault tolerant storage devices are organized on a disk drive system comprising a plurality of Redundant Array of Inexpensive Disks (RAID) systems, each RAID system of the plurality of RAID systems having a first disk drive and a second disk drive.

4. The method of claim 1, further comprising:
   sending a query, by a client, to a Redundant Array of Inexpensive Disks (RAID) component of a storage system for determining the amount of storage resources required to perform the storage operation; and
   providing, by the RAID component, information regarding the amount of storage resources required to the client.

5. The method of claim 4, further comprising:
   allocating, by the client, the storage resources for performing the storage operation.

6. The method of claim 5, further comprising:
   receiving, by the RAID component, the storage resources allocated by the client; and
   evaluating, by the RAID component, whether the storage resources provided by the client are sufficient to perform the storage operation.

7. The method of claim 4, wherein the client provides information regarding the storage operation to the RAID component for determining the amount of storage resources required to perform the storage operation.

8. The method of claim 4, wherein the RAID component overestimates the amount of storage resources required to perform the storage operation.

9. The method of claim 1, wherein the set of criteria includes information regarding the storage operation and information regarding the type of fault tolerant storage devices.

10. The method of claim 1, determining the total amount of storage resources further comprises:
    determining an amount of storage for data of the storage operation.

11. The method of claim 10, wherein determining the amount of storage for the data of the storage operation comprises:
    determining a block count and a block size associated with the data of the storage operation.

12. A system for use in managing storage operations in storage systems, the system comprising a processor configured to:
    based on a set of criteria, determine total amount of storage resources of a storage system required to completely perform a storage operation, wherein the storage operation is directed to fault tolerant storage devices of the storage system, wherein the total amount of storage resources is determined prior to sending a request to perform the storage operation;
    based on the determination of the total amount and based on the type of storage resources required to completely perform the storage operation, allocate the total amount of storage resources prior to starting to perform the storage operation; and
    avoid waiting for any additional storage resources required during execution of the storage operation to complete the storage operation to become available during performance of the storage operation by performing the storage operation using the allocated storage resources that are determined and allocated prior to starting the storage operation, wherein determining the total amount of storage resources comprises determining, prior to sending the request to perform the storage operation, amounts of memory buffers, control buffers, control structures, buffers for reading data, buffers for reading parity, buffers for calculation of a new parity, or any combination thereof, that would be incurred in the course of executing the storage operation to complete the storage operation.

13. The system of claim 12, wherein the storage operation includes a Redundant Array of Inexpensive Disks (RAID) operation performed on a RAID system.

14. The system of claim 12, wherein the fault tolerant storage devices are organized on a disk drive system comprising a plurality of Redundant Array of Inexpensive Disks (RAID) systems, each RAID system of the plurality of RAID systems having a first disk drive and a second disk drive.

15. The system of claim 12, further comprising:
    send a query, by a client, to a Redundant Array of Inexpensive Disks (RAID) component of a storage system for determining the amount of storage resources required to perform the storage operation; and
    provide, by the RAID component, information regarding the amount of storage resources required to the client.

16. The system of claim 15, further comprising:
    allocate, by the client, the storage resources for performing the storage operation.

17. The system of claim 16, further comprising:
    receive, by the RAID component, the storage resources allocated by the client; and
    evaluate, by the RAID component, whether the storage resources provided by the client are sufficient to perform the storage operation.

18. The system of claim 15, wherein the client provides information regarding the storage operation to the RAID component for determining the amount of storage resources required to perform the storage operation.

19. The system of claim 15, wherein the RAID component overestimates the amount of storage resources required to perform the storage operation.

20. The system of claim 12, wherein the set of criteria includes information regarding the storage operation and information regarding the type of fault tolerant storage devices.

* * * * *